United States Patent [19]
Krieger et al.

[11] Patent Number: 5,803,326
[45] Date of Patent: Sep. 8, 1998

[54] TOUR GUIDE CABINET FOR USE IN A PASSENGER VEHICLE

[75] Inventors: John W. Krieger, Oxnard, Calif.; Sandy S. Friesen, Regina, Canada

[73] Assignee: Motor Coach Industries Ltd., Winnipeg, Canada

[21] Appl. No.: 721,661

[22] Filed: Sep. 27, 1996

[51] Int. Cl.$^6$ .............................. B60R 7/04; B47B 83/00
[52] U.S. Cl. .......................... 224/275; 224/540; 224/542; 224/541; 297/135; 297/188.2; 312/235.8; 108/44; 296/37.15
[58] Field of Search .................................... 224/275, 542, 224/540, 541; 297/188.2, 188.01, 135; 296/37.15, 63, 65.1; 312/235.8, 235.9

[56] References Cited

U.S. PATENT DOCUMENTS

| | | | |
|---|---|---|---|
| 3,279,872 | 10/1966 | Howke | 224/275 |
| 3,345,118 | 10/1967 | Cummings | 108/44 |
| 3,517,978 | 6/1970 | Hudson | 312/235.8 |
| 4,512,503 | 4/1985 | Gioso | 224/275 |
| 5,092,507 | 3/1992 | Szablak et al. | 312/235.8 |

Primary Examiner—Linda J. Sholl
Attorney, Agent, or Firm—Adrian D. Battison; Murray E. Thrift

[57] ABSTRACT

A tour guide cabinet for a coach comprises a cabinet body having a rear portion resting upon a seat frame of the coach and a front portion having a bottom surface resting upon the floor of the coach forwardly of the seat. The front and rear portions each defining an upper surface spaced upwardly of the seat and arranged to define at least one storage compartment therein for receiving tour guide materials. The cabinet body has a width so as to overlie only one half of a double seat leaving the other part for the tour guide. A shelf extends from the cabinet body outwardly to one side. The front portion includes a storage cabinet with a drawer underneath the bottom surface of the rear portion and forwardly of the seat. The bottom surface of the rear portion includes a clamp to engage onto the seat frame with the cushion removed. The upper surface of the rear portion includes a part thereof extending rearwardly beyond a rear edge of the bottom surface of the rear portion with a rear edge of the part being curved in plan view so as to follow a contour of a seat back cushion of the seat.

20 Claims, 5 Drawing Sheets

TOUR GUIDE CABINET FOR USE IN A PASSENGER VEHICLE

This invention relates to a cabinet for use in a passenger vehicle of a type which can be used by a host or tour guide in the vehicle.

BACKGROUND OF THE INVENTION

Many passenger vehicles, particularly motor coaches sometimes make use of a tour guide or host for accompanying passengers who acts to service those passengers with information and other materials. These are particularly applicable in bus tours where the tour is guided by the host or tour guide.

At the present time very few motor coaches are equipped with a cabinet or other container which assists the host or tour guide in storing the necessary materials. In practice, therefore, the host or tour guide often carries the material in a portable box and simply places the material on a seat next to the host or tour guide.

It will be appreciated that most such passengers vehicles include two rows of seating with the seats being arranged in pairs.

A specialized cabinet for use by a tour guide has previously been proposed and is shown in a photograph. This cabinet is mounted in the motor coach on the side opposite to the driver as a replacement for the front courtesy panel and one of the seats at the front of the row of seats on that side of the vehicle. The cabinet therefore permanently replaces one of the seats in the front of that row and thus effectively permanently reduces the total number of seating available should the coach be required for use in an arrangement where the host or tour guide is not required.

SUMMARY OF THE INVENTION

It is one object of the present invention, therefore, to provide a tour guide cabinet for mounting in a motor vehicle which allows ready insertion and removal of the cabinet so that the cabinet can be used when required, quickly removed when not required and full seating compliment returned.

According to one aspect of the invention there is provided a combination of a passenger transport vehicle and a tour guide cabinet therefor;

the vehicle comprising:

a vehicle floor having at least one row of seats therein for receiving passengers thereon, at least one of the seats including a seat frame and seat cushions arranged to provide a first and a second location for supporting two passengers side by side, the vehicle floor having a floor area in front of the seat for receiving the legs of the passengers when seated; the tour guide cabinet comprising: a cabinet body having a front a portion and a rear portion; the rear portion having a bottom surface arranged for resting upon the seat frame, the front portion having a bottom surface for resting upon the floor in the floor area forwardly of the seat; the front and rear portions each defining an upper surface spaced upwardly of the seat and arranged to define at least one storage compartment therein for receiving tour guide materials; the cabinet body having a width so as to overlie only the first location leaving the second location free from the cabinet body for receiving the tour guide seated therein; and a shelf arranged so as to extend from the cabinet body outwardly to one side for access by the tour guide seated in the second location.

Preferably the front portion includes a storage cabinet therein in an area underneath a height of the bottom surface of the rear portion and lying in the area forwardly of the seat.

Preferably the storage cabinet in a front portion includes a drawer which slides in a direction to one side of the cabinet body toward the second location.

Preferably the seat includes a seat frame and two separate cushions each lying in a respective one of the locations and wherein the bottom surface of the rear portion is arranged to clamp onto the seat frame with the cushion in said one location removed.

Preferably the upper surface of the rear portion includes a part thereof extending rearwardly beyond a rear edge of the bottom surface of the rear portion with a rear edge of the part being curved in plan view so as to follow a contour of a seat back cushion of the seat.

Preferably the shelf is movable from a first position overlying the cabinet body to a second position projecting outwardly to said one side of the said cabinet body.

Preferably the shelf is also movable forwardly and rearwardly of the cabinet body.

Preferably the shelf is mounted on a double lever system and moves relative to a slide member mounted on the upper surface of the cabinet body and extending upwardly therefrom into a receptacle on an underside of the shelf, the receptacle and the slide member defining restrictions for the amount of movement of the shelf.

Preferably the seat of the row comprises a forward most one of the seats located immediately rearwardly of a driver's seat and wherein there is provided a convexly curved modesty panel rearwardly of the driver's seat and in front of the floor area and wherein a forward edge of the cabinet body has a concave curvature for following the convex curvature of the modesty panel.

Preferably a front edge of the shelf is curved to follow the convex curvature of the modesty panel.

Preferably a rear edge of the shelf is curved to follow the curvature of the front edge.

Preferably there is provided a first and a second cover panel each for covering a portion of the upper surface of the cabinet body, each of the cover panels being hinged about a horizontal axis along a side of the cabinet body opposite to said second location.

Preferably the second cover panel is slidable forwardly and rearwardly of the upper surface of the cabinet body so as to move from a position covering a part of the upper surface to a second position underlying the first cover panel.

Preferably the first cover panel includes means for holding the first cover panel in a raised open position and wherein the second cover panel includes means for attachment to the first cover panel In the raised position such that both cover panels are simultaneously held in the raised position.

Preferably the seat of the row comprises a forward most one of the seats located immediately rearwardly of a driver's seat and wherein there is provided a convexly curved modesty panel rearwardly of the driver's seat and in front of the floor area and wherein a forward edge of the cabinet body has a concave curvature for following the convex curvature of the modesty panel and wherein each of the first and second cover panels has a curved front and a curved rear edge so as to match the shape of the modesty panel.

One embodiment of the invention will now be described in conjunction with the accompanying drawings in which:

BRIEF DESCRIPTION OF THE DRAWINGS

In the drawings like characters of reference indicate corresponding parts in the different figures.

DETAILED DESCRIPTION

Figure 2:
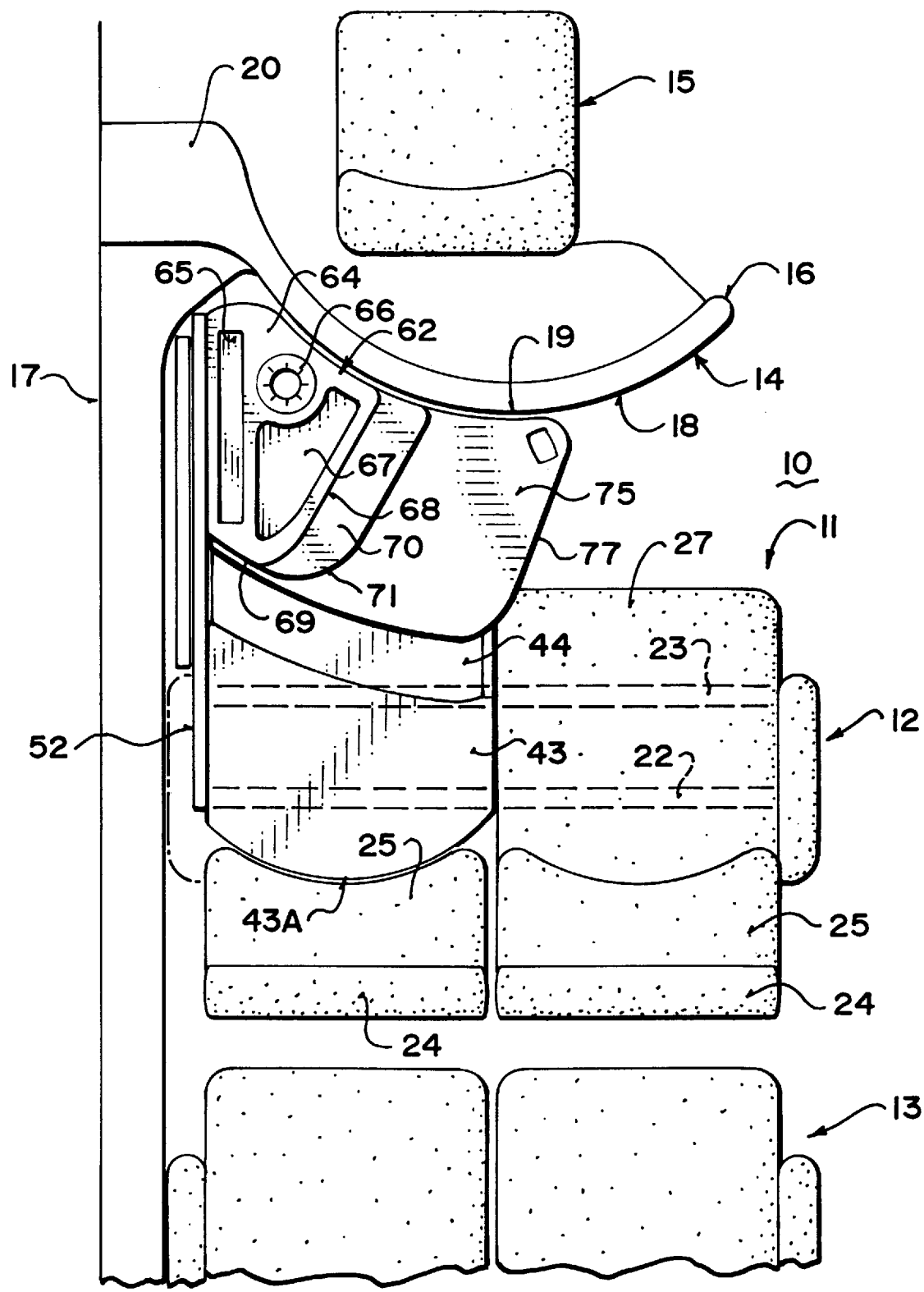
FIG. 2 is a top plan view of the arrangement shown in FIG. 1.

A motor coach with which the tour guide cabinet of the present convention is associated is shown in FIG. 2. As the majority of motor coaches are of very conventional construction, only those parts relating to the cabinet are shown and include a vehicle floor 10 on which is mounted a row of seats 11 including a first pair of seats 12 and a second pair of seats 13. Forwardly of the first row of seats 12 is provided a modesty panel 14 which separates the front row 12 of seats from a driver seat 15. The modesty panel 14 is smoothly convexly curved from a nose 16 extending across to one side wall 17 of the vehicle. Thus the modesty panel defines the convex surface 18 facing the front seats 12 which curves to a position closest to the front seats indicated at 19 which is located part way across the pair of seats 12. From that position 19, the modesty panel curves forwardly to an end 20 at the side wall 17.

Figure 1:
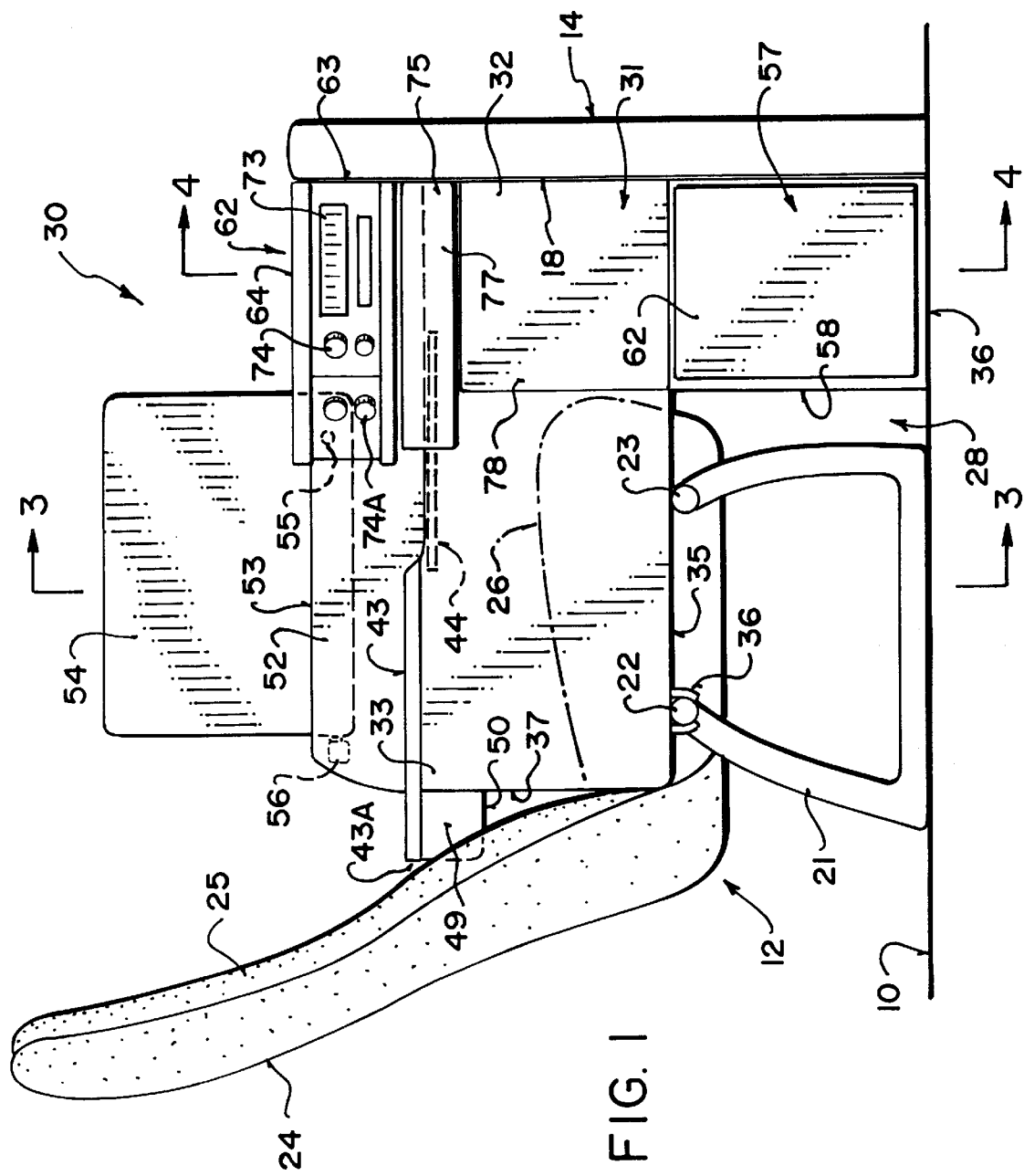
FIG. 1 is a side elevational view of the tour guide cabinet according to the present Invention installed in position in one seat of a seat pair of a motor vehicle.

The seats 12 are also shown in FIG. 1 and include a seat base 21 resting upon the floor 10 and attached thereto by suitable fasteners (not shown). The seat 12 includes a seat frame defined in part by a pair of horizontal parallel transverse tubes 22 and 23 attached to the base and supported by the base. The frame further includes supports (not shown) for a seat back 24 with a seat cushion 25 which extends upwardly and rearwardly from the frame including the rail 22 and 23. On top of the seat frame is mounted a pair of seat base cushions 26 and 27. The seat thus in effect defines two bucket seats which have the bottom cushion and rear cushion curved so as to surround the passenger. The seat cushions 26 and 27 can be removed so as to expose the rail 22 and 23 and in FIG. 2 the cushion in the first location of the seat is indeed removed for purposes of receiving the tour guide cabinet.

In front of the seat is provided an open area of the floor for receiving the legs of the passenger when seated in the seat, the open area being indicated at 28.

The tour guide cabinet generally indicated at 30 includes a cabinet body 31 having a front portion 32 and a rear portion 33. The front and rear portions are integrally formed so as to define a rigid cabinet structure. The width of the front and rear portions is substantially equal and equal to the width of the first location of the seat adjacent to the window so that the cabinet can be positioned in the first location of the seat with the seat cushion 26 removed leaving the second location of the seat and the cushion 27 in place for receiving the host or tour guide.

The rear portion 33 includes a base wall 35 at a height so as to sit directly upon the rail 22 and 23. A manually operable clamp 36 is attached to the base wall 35 and can engage one or both of the rails 22, 23. The clamp is of a type which allows it to be simply press in place over the rail and then snap fastened to remain attached to the rail thus holding the cabinet in place fixed to the seat without possibility of breaking free from the seat and moving within the vehicle.

The front portion 32 includes a base wall 36 at a height lower than the base wall 35 and arranged to sit on the floor 10 in the area 28.

The cabinet further includes a rear wall 37 which is arranged at a position to engage the seat back cushion 25. The cabinet includes a front wall 38 shaped and arranged to engage the surface 18 of the modesty panel.

Figure 3:
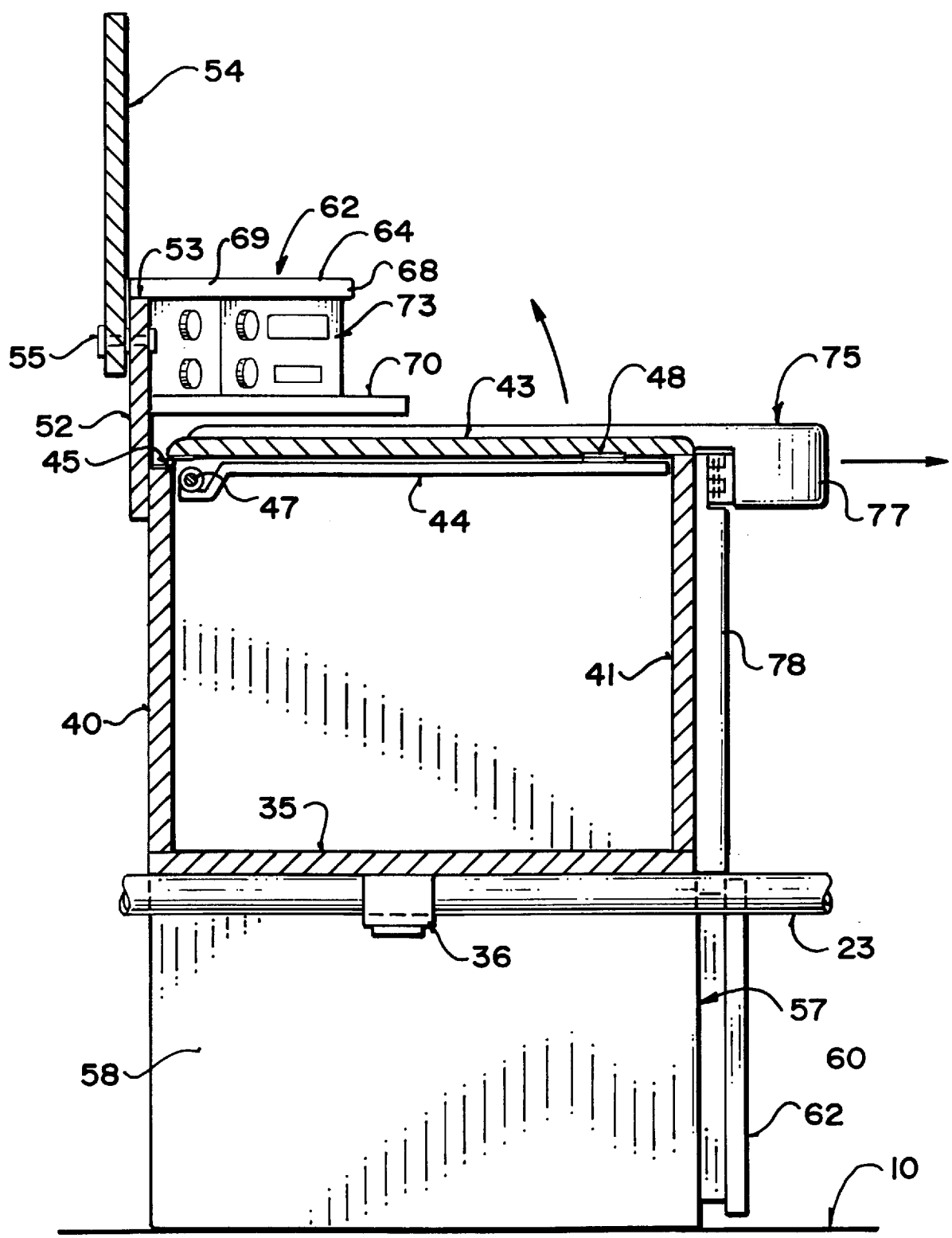
FIG. 3 is a cross sectional view along the lines 3—3 of FIG. 1.
Figure 4:
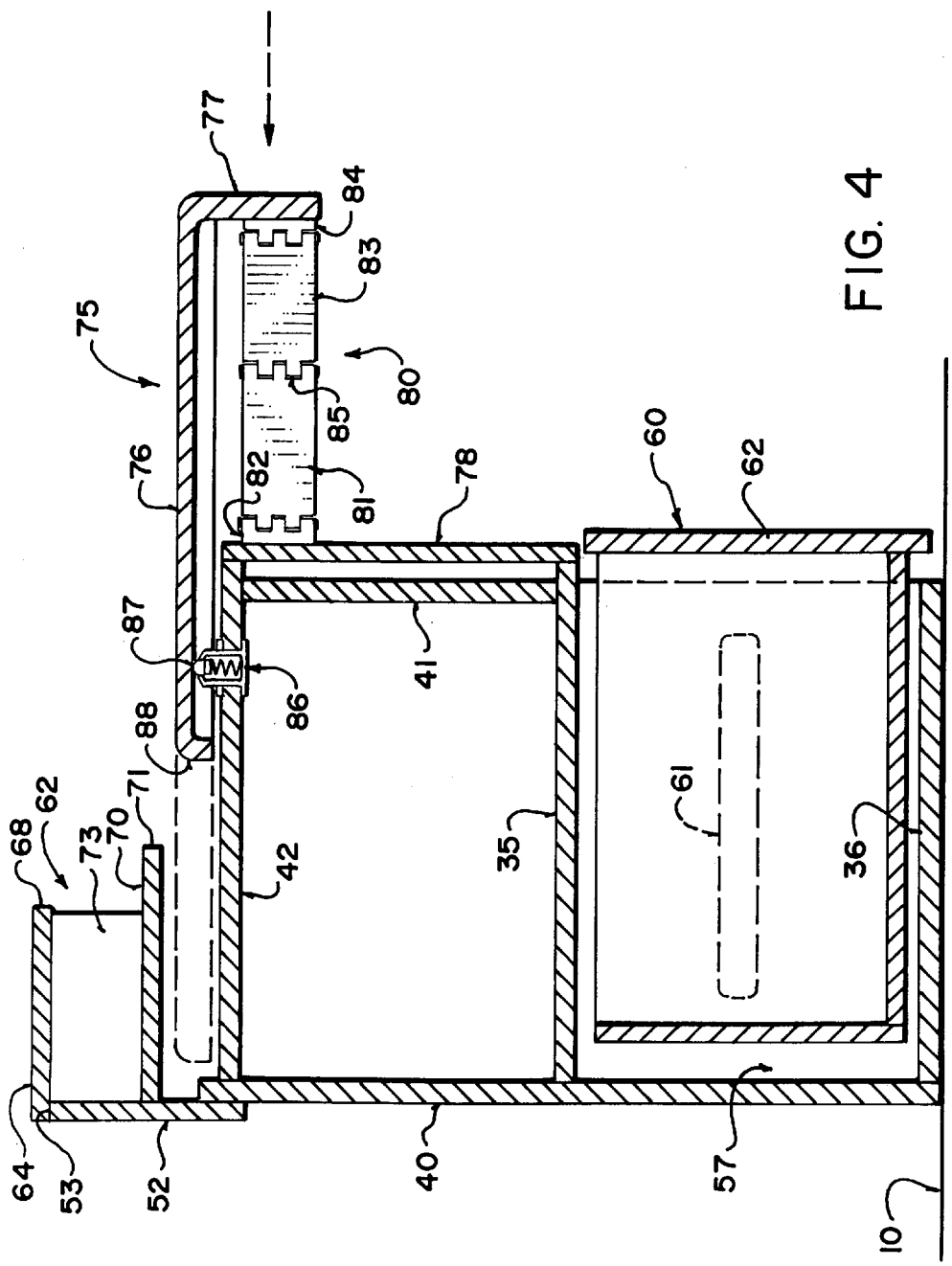
FIG. 4 is a cross sectional view along the lines 4—4 of FIG.1.
Figure 5:
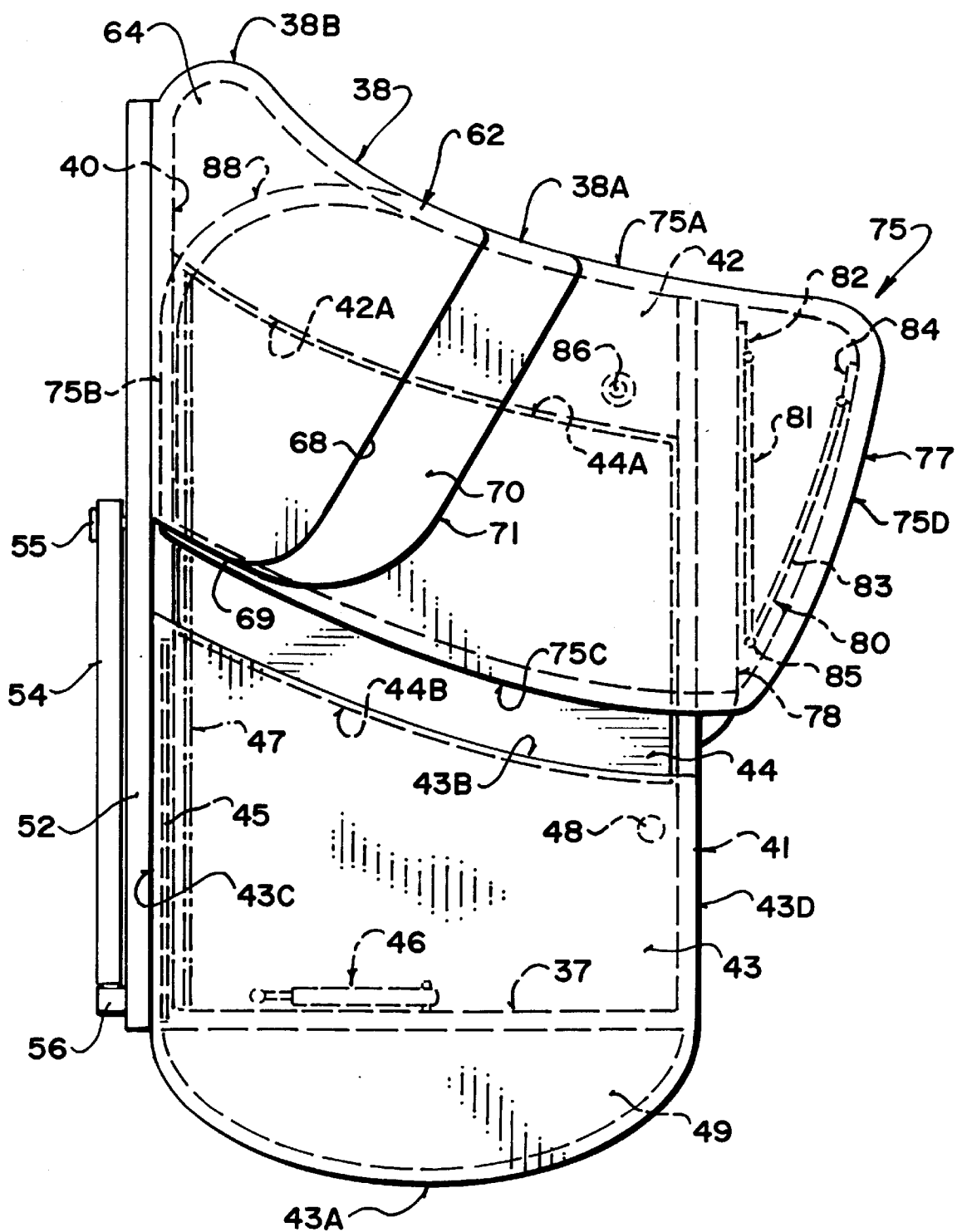
FIG. 5 is, a top plan view similar to that of FIG. 2 on an enlarged scale showing only the tour guide cabinet.

The construction of the cabinet is basically best shown in FIGS. 3, 4 and 5. Thus the cabinet includes the vertical rear wall 37, the vertical wall 38, one side wall 40 and a second side wall 41. The side walls 40 and 41 are parallel and straight and extend from the rear wall 37 through to the front wall 38. The rear wall 37 is also straight and vertical and at right angles to the side walls. The front wall 38 is formed with a concave curvature as indicated at 38A to follow the service 18 of the modesty panel and at the part adjacent the side wall 40 forms a convex curvature section 38B which curves back toward the side wall 40. These walls thus define a hollow interior for receiving materials from the tour guide such as files, leaflets and literature for the tour or passengers. The compartment can be divided by divider plates into separate containers in conventional manner.

A forward part of the compartment is covered by a fixed cover panel 42 having a front edge following the wall 38 and a rear edge 42A which is generally curved following the curvature of the wall 38 and spaced therefrom. The fixed panel 42 thus covers only a small part of the compartment.

The remainder of the compartment is covered by a first cover panel 43 and a second cover panel 44. The first cover panel 43 extends from a rear edge 43A to a front edge 43B. The rear edge 43A overhangs the wall 37 and projects rearwardly therefrom and defines a convexly curved surface shaped to match into the concave recess of the cushion 25. The cover panel 43 has a side edge 43C overlying the side wall 40 and attached thereto by a hinge 45. A second side edge 43D of the first cover panel overlies the side wall 41. The first cover panel can therefore be lifted by pivotal movement about a horizontal axis at the top of the side wall 40 defined by the hinge 45. The first cover panel is held in the open and closed positions by a cylinder 46 attached between the underside of the cover panel and the Inside surface of the rear wall 37. The cylinders are of the commercially available type which holds the cover panel in the two positions and effects a spring assist between the positions.

The second cover panel 44 is mounted on a rail 47 which extends from the rear wall 37 to the rear edge of the front panel 42 and lies close to the hinge 45. The rail is positioned underneath the first panel 43. The second panel 44 is mounted on the rail for sliding movement longitudinally along the rail and for hinged movement around the axis defined by the rail. The second cover panel can thus slide to a position underneath the first cover panel to open the area underneath the second cover panel extending from a front edge 44A of the second cover panel to a rear edge 44B of the second cover panel. Also when the first cover panel is opened to the vertical raised position, the second cover panel can also be lifted to the raised position. A magnetic coupling between the first and second cover panels holds the second cover panel in open position when the second cover panel is raised from its position underneath the first cover panel. The magnetic coupling is indicated at 48 and is mounted on an undersurface of the first cover panel and the top surface of the second cover panel. Thus both cover panels can be opened to expose the whole of the interior of the compartment or only the first cover panel can be open leaving the second cover panel in close position lying on top of the compartment, its position being adjustable by sliding along the rail 47.

Underneath the overhanging portion at the rear of the first cover panel 43 is provided a cabinet portion 49 which extends rearwardly from the rear wall 37. As shown in FIG. 1, the portion 49 has a rear wall underlying the rear edge 43A with that rear wall having a depth which is relatively small in comparison with the depth of the wall 37. A bottom wall 50 of the portion 49 extends forwardly from the rear wall to join with the wall 37. Thus when viewed from the top with the first cover panel, the portion 49 provides an attractive appearance filling the opening defined by the curvature and rearward inclination of the cushion 25. The portion 49 defines one or more small compartments for receiving smaller materials.

At the top of the side wall 40 is mounted an upwardly projecting side wall 52 which is a top edge 53 at a common horizontal height of the open top of the cabinet. The side panel 52 extends from the end wall 37 to the front wall 38 and is permanently and rigidly fixed to the side wall 40 so as to stand upwardly therefrom. A pivotal supplementary wall panel 54 is attached to the panel 52 adjacent the top edge 53 thereof and is mounted for pivotal movement on a pin 55. In a raised position as shown in FIG. 1, the supplementary panel defines a pinboard projecting upwardly into the window area above the top edge 53 of the panel 52. The supplementary panel can be folded downwardly into a stored position alongside the side wall 40 by releasing a catch 56 holding it in the raised position and allowing it to fold downwardly by pivotal movement about the horizontal pin 55.

The front portion 31 of the cabinet includes a front portion of the compartment previously defined together with an additional downwardly extending section 57. The section 57 defines a compartment underneath the bottom wall 35. The compartment 57 is defined on one side by the front wall 38 and on the other side by a vertical wall 58 parallel to the wall 37. The compartment is closed at the bottom by the base wall 36. The compartment 57 is open at the front and receives a drawer 60 slidable on rails 61 counted In the compartment 57. A front panel 62 of the drawer closes the open front face of the compartment 57. The drawer thus slides outwardly to one side of the cabinet and into the area 28 where the legs of the tour guide would normally be located. The compartment can be used for further storage or can be used for a garbage container.

A console section 62 is located at the front corner of the cabinet adjacent the aide wall 40. Tho console section 62 has a front wall 63 following the curvature of the wall 38 and substantially extending vertically upwardly therefrom. The console section has a horizontal top wall 64 which is arranged at the height of the top edge 53 of the panel 52. The horizontal top wall 64 includes a slot 65 which is rectangular and extends along parallel to the panel 52 as best shown in FIG. 2 for receiving large books or files or the like. A circular cup holder 66 is located in the top wall 64. A shallow receptacle 67 is shaped around the cup holder and extends from the slot and the cup holder toward a side edge 68 of the top wall 64. The side edge 68 extends from a position partway along the front wall 38A in the inclined direction toward the side wall 40 and joins with a rear edge 69 of the top wall 64 which extends forwardly and toward the side wall 40. Thus the rear edge 69 generally follows the shape of the front edge. The side edge 68 is arranged at an angle so that it faces generally toward the tour operator seated in the second location.

Underneath the horizontal top wall 64 Is provided a horizontal bottom wall 70 which follows generally the shape of the top wall but includes a portion extending outwardly beyond the edge 68 to form a side edge 71 of the bottom wall. In between the top and bottom walls is thus defined a generally rectangular front face for receiving a control unit 73 for the entertainment system of the vehicle. The control unit includes control knobs 74 and various other accessories 75 may be provided in the rear wall 69.

The bottom wall 70 of the console section is spaced upwardly from the front fixed cover panel 42. A shelf 75 is located in this space and lies across the top of the fixed panel 42 and partly over the open area of the compartment. The shelf 75 includes a horizontal shelf wall 76 and a downturned side lip 77 at an edge of the shelf which projects outwardly from the side wall 41 of the cabinet.

The shelf has a front edge 75A which follows generally the curvature of a wall 38. One side edge 75B of the shelf follows the side wall 40. A rear edge 75C of the shelf follows generally the curvature of the wall 38. At the side wall 41, the shelf projects outwardly beyond that side wall to form portions of the front and rear walls which are contiguous therewith and a side edge which contains the lip 77. The projecting portion extends out slightly further at the front edge than at the rear edge.

Underneath the shelf is provided a false side wall 78 located outwardly of the wall 41 at the front portion of the cabinet. This false wall 78 also extends downwardly to define the side wall of the compartment 57. The false wall 78 carries a lever linkage 80 supporting the shelf for sliding movement in a horizontal direction both side to side and forward to rearward. The lever linkage includes a first lever 81 pivotally connected by a mounting bracket 82 to the false wall 78 and a second lever 83 pivotally connected by a bracket 84 to the lip 77. The levers 81 and 83 are coupled by a hinge 85. The levers and the hinges are of sufficient height to support the weight of the shelf when cantilevered out from the false wall 78.

Movement of the shelf in sliding action across the fixed front panel 42 is guided by a roller support 86 in the form of a spring mounted ball 87 which rolls on the underside of the shelf wall 76. A downturned lip 88 around the edge of the shelf locates the shelf so that it cannot go beyond the roller guide 86. The roller guide 86 is carried in the end panel 42. Thus the shelf can move from a position shown in FIG. 5 in which it is basically stored on top of the cabinet with a small portion projecting outwardly to the side, to a position shown in FIG. 4 in which the shelf is pulled out to the side to a position overlying the second seat location. The panel can also be moved forwardly and rearwardly to a position in which the panel overlies the seat cushion.

The cabinet therefore provides a storage system and useful surface together with a control console suitable for the tour guide. The cabinet can be readily inserted into place in the first seat location allowing the tour guide to sit in the second seat location. The device can be readily removed when the coach does not require the device whereupon the maximum number of seating is again available for passengers.

Since various modifications can be made in my invention as herein above described, and many apparently widely different embodiments of same made within the spirit and scope of the claims without departing from such spirit and scope, it is intended that all matter contained in the accompanying specification shall be interpreted as illustrative only and not in a limiting sense.

We claim:

1. A combination of a passenger transport vehicle and a tour guide cabinet therefor;

the vehicle comprising:
a vehicle floor having at least one row of seats therein for receiving passengers thereon, at least one of the seats including a seat frame and seat cushions arranged to provide a first and a second location for supporting two passengers side by side, the vehicle floor having a floor area in front of the seat for receiving the legs of the passengers when seated;

the tour guide cabinet comprising:
a cabinet body having a front a portion and a rear portion;
the rear portion having a bottom surface arranged for resting upon the seat frame, the front portion having a bottom surface for resting upon the floor in the floor area forwardly of the seat;
the front and rear portions each defining an upper surface spaced upwardly of the seat and arranged to define at least one storage compartment therein for receiving tour guide materials;
the cabinet body having a width so as to overlie only the first location leaving the second location free from the cabinet body for receiving the tour guide seated therein;
and a shelf arranged so as to extend from the cabinet body outwardly to one side for access by the tour guide seated in the second location.

2. The combination according to claim 1 wherein the front portion includes a storage cabinet therein in an area underneath a height of the bottom surface of the rear portion and lying in the area forwardly of the seat.

3. The combination according to claim 2 wherein the storage cabinet in a front portion includes a drawer which slides in a direction to one side of the cabinet body toward the second location.

4. The combination according to claim 1 wherein the seat includes a seat frame and two separate cushions each lying in a respective one of the locations and wherein the bottom surface of the rear portion is arranged to engage onto the seat frame with the cushion in said one location removed.

5. The combination according to claim 4 including clamp means on the rear portion for engaging a frame member of the seat frame.

6. The combination according to claim 4 wherein the upper surface of the rear portion includes a part thereof extending rearwardly beyond a rear edge of the bottom surface of the rear portion with a rear edge of the part being curved in plan view so as to follow a contour of a seat back cushion of the seat.

7. The combination according to claim 1 wherein the shelf is movable from a first position overlying the cabinet body to a second position projecting outwardly to said one side of the said cabinet body.

8. The combination according to claim 7 wherein the shelf is also movable forwardly and rearwardly of the cabinet body.

9. The combination according to claim 9 wherein the shelf is mounted on a double lever system and moves relative to a slide member mounted on the upper surface of the cabinet body and extending upwardly therefrom into a receptacle on an underside of the shelf, the receptacle and the slide member defining restrictions for the amount of movement of the shelf.

10. The combination according to claim 1 wherein the seat of the row comprises a forward most one of the seats located immediately rearwardly of a driver's seat and wherein there is provided a convexly curved modesty panel rearwardly of the driver's seat and in front of the floor area and wherein a forward edge of the cabinet body has a concave curvature for following the convex curvature of the modesty panel.

11. The combination according to claim 10 wherein a front edge of the shelf is curved to follow the convex curvature of the modesty panel.

12. The combination according to claim 11 wherein a rear edge of the shelf is curved to follow the curvature of the front edge.

13. The combination according to claim 1 including at least one cover panel for covering the upper surface of the cabinet body.

14. The combination according to claim 13 wherein there is provided a first and a second cover panel each for covering a portion of the upper surface of the cabinet body, each of the cover panels being hinged about a horizontal axis along a side of the cabinet body opposite to said second location.

15. The combination according to claim 14 wherein the second cover panel is slidable forwardly and rearwardly of the upper surface of the cabinet body so as to move from a position covering a part of the upper surface to a second position underlying the first cover panel.

16. The combination according to claim 15 wherein the first cover panel includes means for holding the first cover panel in a raised open position and wherein the second cover panel includes means for attachment to the first cover panel in the raised position such that both cover panels are simultaneously held in the raised position.

17. The combination according to claim 14 wherein the seat of the row comprises a forward most one of the seats located immediately rearwardly of a driver's seat and wherein there is provided a convexly curved modesty panel rearwardly of the driver's seat and in front of the floor area and wherein a forward edge of the cabinet body has a concave curvature for following the convex curvature of the modesty panel and wherein each of the first and second cover panels has a curved front and a curved rear edge so as to match the shape of the modesty panel.

18. The combination according to claim 1 including a raised console portion at a front part of the front portion on a side thereof opposite the second location, the raised console portion including means for receiving a control system for the vehicle entertainment system.

19. The combination according to claim 1 including a side panel extending vertically upwardly from the upper surface on a side opposite the second location.

20. The combination according to claim 19 including a pivotal extra side panel mounted on the first side panel for pivotal movement about a horizontal axis so as to be movable from a storage position to a raised position standing upwardly above the first side panel.

* * * * *